United States Patent
Kajiwara

(10) Patent No.: US 7,751,091 B2
(45) Date of Patent: Jul. 6, 2010

(54) COMMUNICATION TERMINAL

(75) Inventor: Tomohito Kajiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1033 days.

(21) Appl. No.: 11/425,279

(22) Filed: Jun. 20, 2006

(65) Prior Publication Data

US 2007/0008578 A1  Jan. 11, 2007

(30) Foreign Application Priority Data

Jul. 5, 2005 (JP) ............................. 2005-196649

(51) Int. Cl.
*H04N 1/00* (2006.01)

(52) U.S. Cl. .................. 358/400; 358/1.15; 358/402; 379/100.01; 379/100.05; 709/238; 709/245; 370/356; 370/230

(58) Field of Classification Search ............... 358/1.15, 358/400, 402, 404, 442, 468; 379/100.01, 379/204, 88.03, 100.05, 100.17; 714/699; 370/356, 395.52, 230, 231; 709/238, 245, 709/230

See application file for complete search history.

(56) References Cited

U.S. PATENT DOCUMENTS

| 5,491,565 | A | 2/1996 | Naper | |
|---|---|---|---|---|
| 6,038,037 | A | 3/2000 | Leung et al. | |
| 6,741,370 | B1* | 5/2004 | Kakoi | 358/468 |
| 6,757,255 | B1* | 6/2004 | Aoki et al. | 370/252 |
| 2002/0024932 | A1* | 2/2002 | Iizuka | 370/232 |
| 2002/0048048 | A1* | 4/2002 | Kagawa | 358/402 |
| 2003/0016395 | A1 | 1/2003 | Kajiwara | |
| 2004/0001224 | A1 | 1/2004 | Kajiwara | |
| 2005/0018657 | A1* | 1/2005 | Nakao et al. | 370/352 |
| 2006/0028692 | A1 | 2/2006 | Kajiwara | |
| 2006/0136596 | A1* | 6/2006 | Izumi | 709/230 |
| 2006/0155864 | A1* | 7/2006 | Izumi | 709/230 |

FOREIGN PATENT DOCUMENTS

| EP | 1 187 445 A2 | 3/2002 |
|---|---|---|
| JP | 62-204654 | 9/1987 |
| JP | 2000-287055 | 10/2000 |
| JP | 2000-354127 | 12/2000 |
| JP | 2002-111952 | 4/2002 |
| JP | 2003-143352 | 5/2003 |
| JP | 2003-179650 | 6/2003 |
| WO | WO 01/86939 A1 | 11/2001 |

OTHER PUBLICATIONS

"Procedures for real-time Group 3 facsimile communication over IP networks", ITU-T Recommendation T.38, XP-002163782, Jun. 1998, pp. 1-30.
Robert G. Tebbs, "Real-Time IP Facsimile: Protocol and Gateway Requirements", Bell Labs Technical Journal, XP-000851514, vol. 4, No. 2, Apr. 1999, pp. 128-145.

* cited by examiner

*Primary Examiner*—Negussie Worku
(74) *Attorney, Agent, or Firm*—Oblon, Spivak, McClelland, Maier & Neustadt, L.L.P.

(57) ABSTRACT

A communication terminal including a terminal interface for communicating with a first facsimile terminal dedicated to using analog facsimile communications, an analog communication part for controlling the analog facsimile communications of the terminal interface, a storage part for storing image data received from the first facsimile terminal, and a network interface part for connecting to an IP network and transmitting the image data stored in the storage part to a second facsimile terminal at a transmission rate greater than the transmission rate of the analog facsimile communication.

13 Claims, 6 Drawing Sheets

COMMUNICATION TERMINAL

BACKGROUND OF THE INVENTION

1. Field of the Invention

A communication terminal having a communication function such as a facsimile transmission function.

2. Description of the Related Art

The ITU-T Recommendation T.38 was established in 1999 for conducting T.30 packet signal communication in real time between facsimile terminals over a packet network. The ITU-T Recommendation T.38 provides two advantages at the same time, namely, function exchange and real time communication between facsimile terminals via a public switched network and little cost in communicating over a network.

After the ITU-T Recommendation T.38 was established, a technology, such as in Japanese Laid-Open Patent Application No. 2002-111952, has been proposed for enabling real-time communications between a network terminal apparatus conforming to the ITU-T Recommendation T.38 and a conventional type facsimile terminal.

Japanese Laid-Open Patent Application No. 2002-111952 discloses a network facsimile terminal that can perform facsimile transmission even when the facsimile terminal of the opponent is not a network facsimile terminal that is directly connectable to a packet network. More specifically, the disclosed network facsimile terminal adjusts the waiting time for receiving and transmitting a signal to the opponent in accordance with the type of the opponent's facsimile terminal. For example, in a case where the opponent's facsimile terminal is a network facsimile terminal that conforms to the ITU-T Recommendation T.38 and is directly connectable to a packet network, the disclosed network facsimile terminal sets a first waiting time. In a case where the opponent's facsimile terminal is a facsimile terminal that does not conform to the ITU-T Recommendation T.38, the disclosed network facsimile terminal sets a second waiting time which is longer than the first waiting time.

The network terminal conforming to the ITU-T Recommendation T.38 (hereinafter referred to as "T.38 terminal") includes an IAF (Internet Aware Fax) type network terminal that is directly connectable to a network and a GW (GateWay) type network terminal that transfers data signals over a telephone network (e.g. public switched telephone network, private line network) in real time.

In a case of communicating in a TCP (Transmission Control Protocol) mode conforming to the ITU-T Recommendation T.38, the communication can be achieved at a high speed.

However, in a case where the receiving side is a GW type T.38 terminal connected to a G3 FAX, the G3 FAX of the receiving side is to perform communications at a speed negotiated (handshake) according to the ITU-T Recommendation T.30. From the standpoint of a terminal on the sending side (e.g. IAF type terminal), this causes the amount of communication data that can be processed in a single time unit (i.e. communication throughput) to decrease.

SUMMARY OF THE INVENTION

The present invention may provide a communication terminal that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by communication terminal particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the invention provides a communication terminal including a terminal interface for communicating with a first facsimile terminal dedicated to using analog facsimile communications; an analog communication part for controlling the analog facsimile communications of the terminal interface; a storage part for storing image data received from the first facsimile terminal; and a network interface part for connecting to an IP network and transmitting the image data stored in the storage part to a second facsimile terminal at a transmission rate greater than the transmission rate of the analog facsimile communications.

In the communication terminal according to an embodiment of the present invention, the image data may be transmitted to the second facsimile terminal via a public switched telephone network when the storage space of the storage part is less than a predetermined value.

Furthermore, another embodiment of the present invention provides a communication terminal including a terminal interface for communicating with a first facsimile terminal dedicated to using analog facsimile communications; a network interface part for connecting to an IP network and receiving image data transmitted from a second facsimile terminal at a transmission rate greater than the transmission rate of the analog facsimile communication; a storage part for storing the image data received from the second facsimile terminal; and an analog communication part for transmitting the image data stored in the storage part to the first facsimile terminal by using the analog facsimile communications.

Accordingly, with the communication terminal according to one of the above-described embodiments of the present invention, the throughput between terminals compatible to high speed communications (e.g. communications conforming to ITU-T Recommendation T.38) can be improved.

Furthermore, with the communication terminal according to one of the above-described embodiments of the present invention, errors can be prevented from occurring when storing image data in a storage part during an operation of transmitting image data to an opponent apparatus via a public switched telephone network (PSTN) in a case where the storage space of the storage part is less than a predetermined value.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to FIGS. 1-6.

Figure 1:
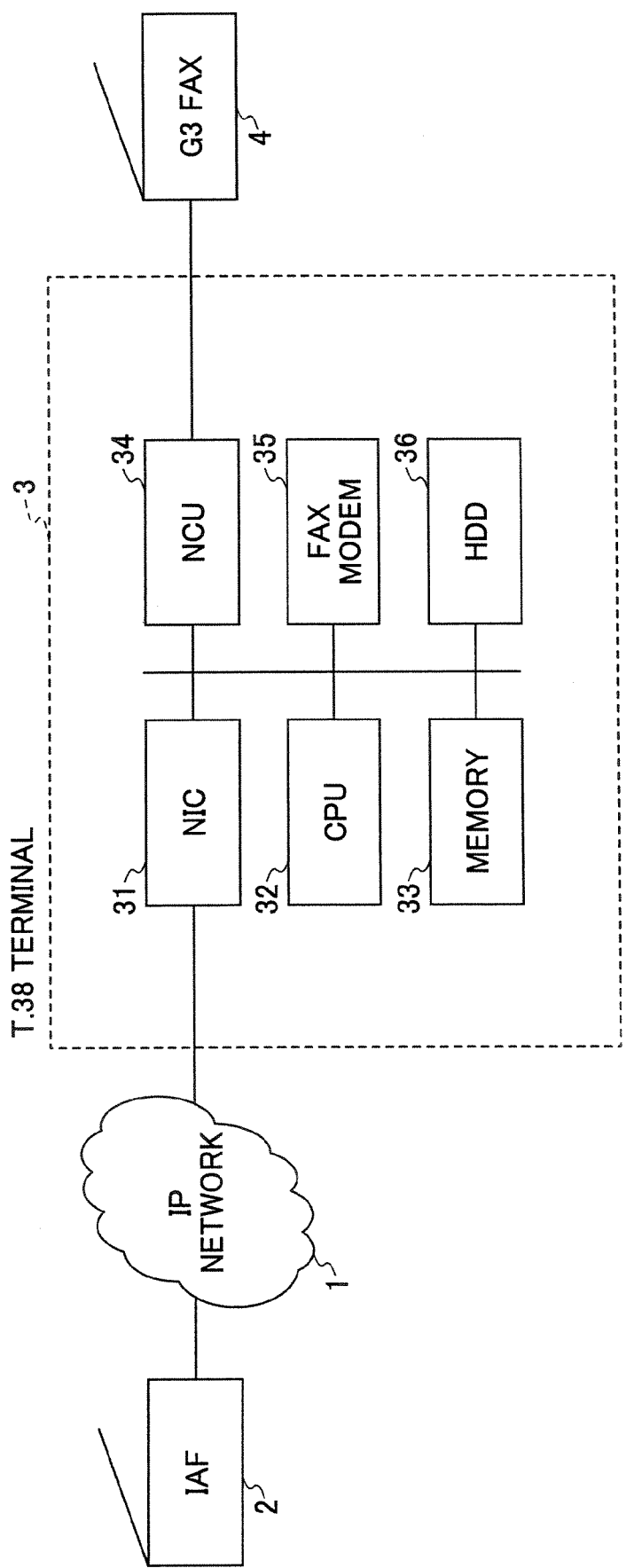
FIG. 1 is a schematic diagram showing an exemplary configuration of a network facsimile system including a communication terminal according to an embodiment of the present invention.

FIG. 1 is a schematic diagram showing an exemplary configuration of a network facsimile system according to an embodiment of the present invention.

The network facsimile system includes, for example, an IAF (Internet Aware Facsimile) 2 connected to an IP (Internet Protocol) network 1, a T.38 terminal 3, and a G3 FAX 4 connected to the T.38 terminal.

The IP network 1 is a logical network of a network layer in TCP/IP (Transmission Control Protocol/Internet Protocol).

The IAF 2 in this embodiment is a network facsimile terminal being directly connectable to a packet network (for example, IP network 1) and conforming to the ITU-T Recommendation T.38. The IAF 2 communicates with an opponent apparatus via the IP network 1 in real-time.

The opponent apparatus communicating with the IAF 2 in real-time includes, for example, an IAF type network facsimile terminal, which is directly connectable to a packet network and conforms to the ITU-T Recommendation T.38, and a GW type network facsimile terminal conforming to the ITU-T Recommendation T.38.

Figure 2:
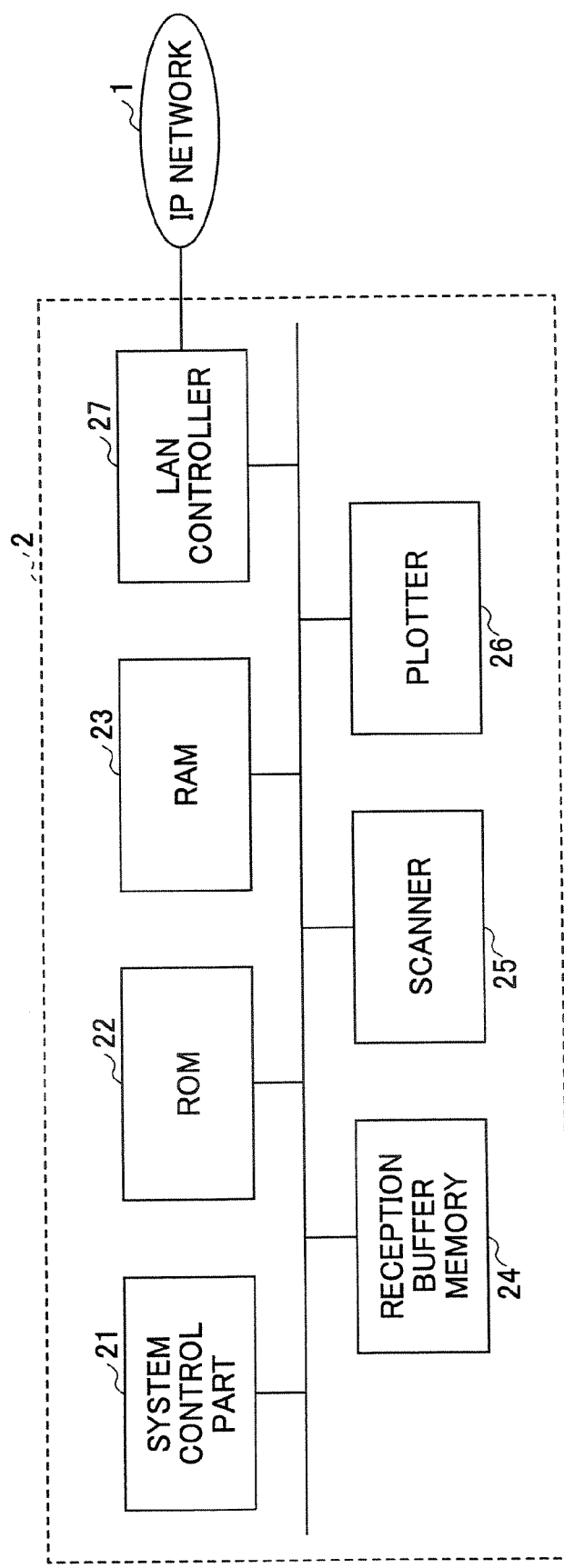
FIG. 2 is a schematic diagram showing an exemplary configuration of an IAF according to an embodiment of the present invention.

FIG. 2 is a schematic diagram showing an exemplary configuration of the IAF 2 according to an embodiment of the present invention.

The IAF 2 includes, for example, a system control part 21, a ROM 22, a RAM 23, a reception buffer memory 24, a scanner 25, a plotter 26, and a LAN controller 27.

The system control part 21 in this embodiment is a microcomputer which uses the RAM 23 as its work space for controlling various parts of IAF 2 in accordance with a control program that is stored in ROM 2.

The ROM 22 is a read only memory storing a control program that enables the system control part 21 to control various parts of the IAF 2.

The RAM 23 is a random access memory used as the work space of the system control part 21.

The reception buffer memory 24 is a memory that buffers received data until the processing of the data is completed.

The scanner 25 is for obtaining data (e.g. image data, text data) by reading an image of a document at a predetermined linear reading density (e.g. 3.85 lines/mm, 7.7 lines/mm, 15.4 lines/mm).

The plotter 26 is for outputting, for example, image data received from another facsimile terminal to a medium in accordance with the predetermined linear density and/or outputting text data read by the scanner 25 in accordance with the linear density (copy operation).

The LAN controller 27, which is connected to the IP network 1, decodes data received from the IP network 1 and encodes data to be transmitted to the IP network 1 by using a LAN protocol. The LAN controller 27 also buffers transmission frames and reception frames and allows the CPU 32 to conduct real-time facsimile communications in the LAN protocol based on the ITU-T Recommendation T.38.

In FIG. 1, the T.38 terminal 3 is a GW type terminal conforming to the ITU-T Recommendation T.38. The T.38 terminal 3 is a terminal adapter type connectable to the G3 FAX 4 via a dedicated telephone line.

As shown in FIG. 1, the T.38 terminal 3 includes a NIC (Network Interface Card) 31, a CPU 32, a memory 33, an NCU (Network Control Unit) 34, a FAX modem 35, and a HDD (Hard Disk Drive) 36.

The NIC 31, which is connected to the IP network 1, decodes data received from the IP network 1 and/or encodes data to be transmitted to the IP network 1 by using the LAN protocol. The NIC 31 also buffers transmission frames and reception frames and allows the CPU 32 to conduct real-time facsimile communications in the LAN protocol based on the ITU-T Recommendation T.38.

The CPU 32 is a central processing unit which uses a RAM in the memory 33 as its work space for controlling various parts of the T.38 terminal 3 in accordance with a control program that is stored in a ROM in the memory 33.

The memory 33 includes various memory devices, for example, a ROM, a RAM, and a reception buffer memory. The reception buffer memory is a memory that buffers received data until the processing of the data is completed.

The NCU 34 is a network controlling apparatus that controls a telephone line for calling up (connecting) or hanging up the telephone.

The FAX modem 35 in this embodiment is a G3 facsimile modem. The FAX modem 35 modulates data to be transmitted through a connected telephone line (telephone network) and demodulates signals received from the telephone network via the NCU 34. The FAX modem 35 also transmits DTMF (Dial Tone Multi Frequency) signals. Furthermore, the FAX modem 35 also has a network controlling function for controlling connections with the communication lines (telephone lines).

The HDD 36 is a large capacity storage apparatus for recording (writing) and reading data to and from a disk rotating at high speed.

The G3 FAX 4 in this embodiment is a facsimile terminal dedicated to an analog telephone line conforming to the G3 standard. The G3 FAX 4 is connected to, for example, a PSTN (Public Switched Telephone Network). The G3 standard is one of the facsimile transmission standards recommended by the ITU. The G3 standard, which is used for communications on an analog telephone line, is able to transmit data at a maximum rate of 9600 bps.

Next, the communication steps for conducting communication of image data in a network facsimile system according to an embodiment of the present invention are described.

Figure 3:
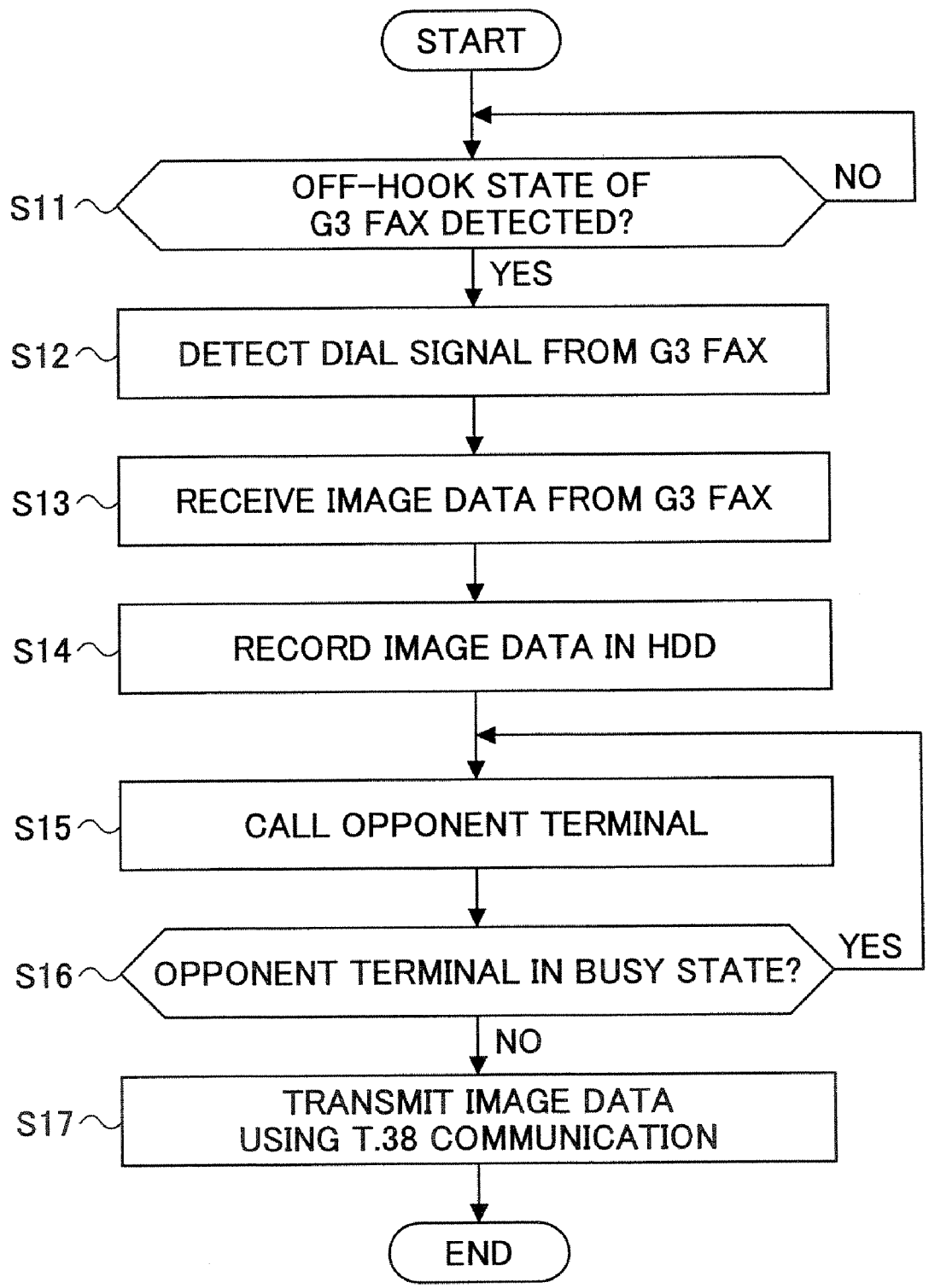
FIG. 3 is a flowchart showing the communication steps in a case of transmitting image data from a G3 FAX to an IAF according to an embodiment of the present invention.

First, an embodiment of an operation of transmitting image data from the G3 FAX 4 to the IAF 2 is described. FIG. 3 is a flowchart showing the communication steps in a case of transmitting image data from the G3 FAX 4 to the IAF 2 according to an embodiment of the present invention.

The T.38 terminal 3 determines (detects) whether the G3 FAX is in an off-hook state (i.e. calling up state) (Step S11).

The T.38 terminal 3 determines that the G3 FAX 4 is in an not in an off-hook state when the T.38 terminal 3 detects no calling from the G3 FAX 4 to an opponent terminal (No in Step S11), and continues to determine the state of the G3 FAX 4.

The T.38 terminal 3 determines that the G3 FAX 4 is in an off-hook state when the T.38 terminal 3 detects the G3 FAX 4 calling the opponent terminal (YES in Step S11).

Then, in response to the calling of the G3 FAX 4, the T.38 terminal 3 conducts a dial signal detection process for detecting a dial signal(s) from the G3 FAX 4 (calling source) (Step S12).

Then, the T.38 terminal 3 communicates with the G3 FAX 4 by using G3 facsimile communications in accordance with the G3 standards, to thereby receive image data from the G3 FAX 4 (Step S13).

Upon receiving the image data, the T.38 terminal 3 records the received image data in the HDD 36 (Step S14).

After the G3 facsimile communication is completed, the T.38 terminal 3 calls up the opponent terminal (transmission destination, in this example, IAF 2) which is to receive the image data (Step S15) transmitted from the G3 FAX 4.

The T.38 terminal 3 determines whether the opponent terminal is in a busy state, in other words, whether the opponent terminal is in a state of receiving other image data (Step S16).

In a case where the opponent terminal is in a busy state (unable to receive the image data) (Yes in Step S16), the T.38 terminal 3 continues to repeat Step S15.

In a case where the opponent terminal is not in a busy state (able to receive the image data) (No in Step S16), the T.38 terminal 3 reads out the image data stored in the HDD 36 and transmits the image data to the opponent terminal by using a high speed TCP transmission method conforming to the ITU-T recommendation T.38 (Step S17). In other words, the image data are transmitted to the opponent terminal by T.38 communication (facsimile communication conforming to ITU-T Recommendation T.38).

Accordingly, the T.38 terminal 3 executes the operation of transmitting data from the G3 FAX 4 by responding to the call of the G3 FAX4, receiving image data by communicating with the G3 FAX 4, storing the image data in the HDD 36, calling the opponent terminal, and transmitting the image data by T.38 communications.

Since high speed communications can be achieved between the T.38 terminal 3 and the opponent terminal (e.g. IAF 2 and/or another terminal having the same configuration as the T.38 terminal 3), the throughput among the terminals can be improved.

Figure 4:
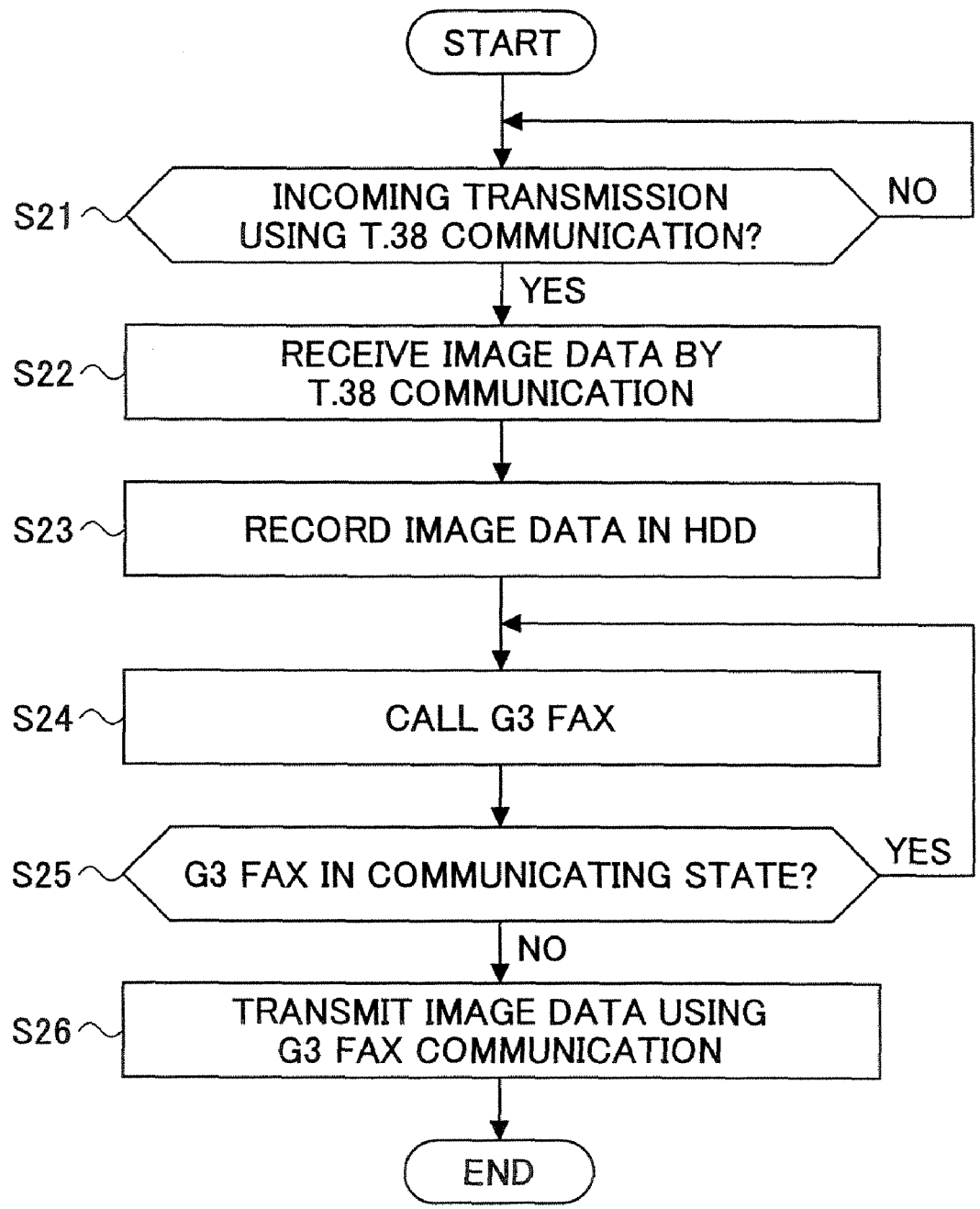
FIG. 4 is a flowchart showing the communication steps in a case of transmitting image data from an IAF 2 to a G3 FAX according to an embodiment of the present invention.

Next, a case of transmitting image data from the IAF 2 to the G3 FAX 4 is described with reference to FIG. 4. FIG. 4 is a flowchart showing the communication steps in a case of transmitting image data from the IAF 2 to the G3 FAX 4 according to an embodiment of the present invention.

The T.38 terminal 3 determines (detects) whether there are any incoming transmissions using T.38 communication from the IAF 2 (Step S21).

In a case where the T.38 terminal 3 detects no incoming transmission using T.38 communication from the IAF 2 (No in Step S21), the T.38 terminal 3 continues the determination.

In a case where the T.38 terminal 3 detects an incoming transmission using T.38 communication from the IAF 2 (i.e. a case where the IAF 2 (transmission source) is calling the G3 FAX4) (Yes in Step S22), the T.38 terminal 3 responds to the call of the IAF 2 (transmission source) and receives image data transmitted from the IAF 2 by using T.38 communications. That is, the image data are transmitted by using a high speed TCP transmission method conforming to the ITU-T Recommendation T.38 (Step S22).

The T.38 terminal 3 records (stores) the received image data in the HDD 36 (Step S23).

After receiving the image data, the T.38 terminal 3 calls up the opponent terminal (in this example, G3 FAX 4) which is to receive the image data (Step S24).

The T.38 terminal 3 determines whether the G3 FAX 4 is in a communicating state, in other words, whether the G3 FAX 4 is in a state of receiving other image data (Step S25).

In a case where the G3 FAX 4 is in a communicating state (unable to receive the image data) (Yes in Step S25), the T.38 terminal 3 continues to repeat Step S24.

In a case where the G3 FAX 4 is not in a communicating state (able to receive the image data) (No in Step S25), the T.38 terminal 3 reads out the image data stored in the HDD 36 and transmits the image data to the G3 FAX 4 by using G3 facsimile communication in accordance with G3 standards (Step S26).

Accordingly, the T.38 terminal 3 executes the operation of transmitting data from the IAF 2 by responding to the call of the IAF 2, receiving image data by communicating with the IAF 2 using T.38 communications, storing the image data in the HDD 36, calling the opponent terminal (G3 FAX 4), and transmitting the image data by G3 communication.

Since high speed communications can be achieved between the T.38 terminal 3 and the transmission source (e.g. IAF 2 and/or another terminal having the same configuration as the T.38 terminal 3), the throughput among the terminals can be improved.

Figure 5:
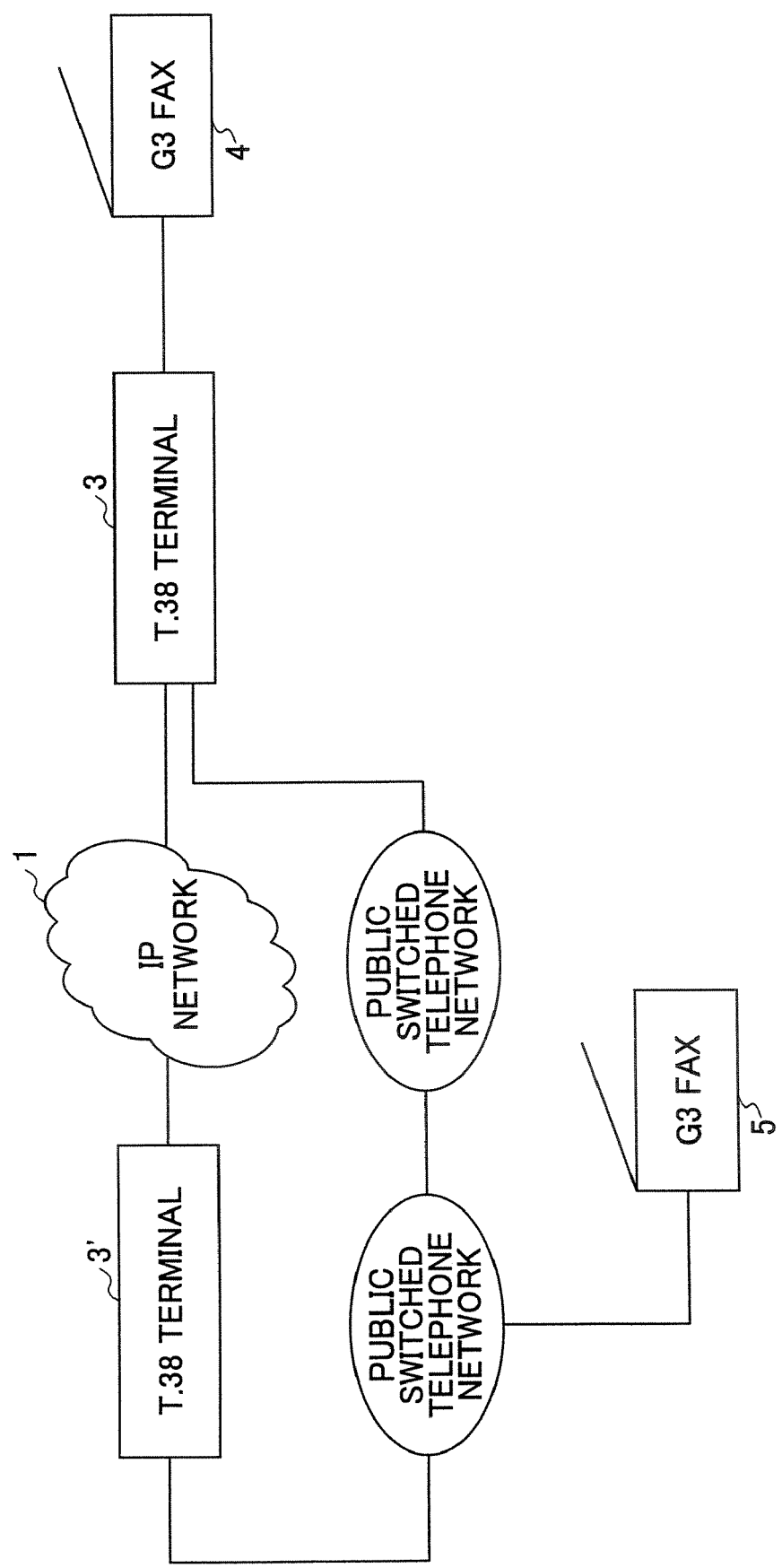
FIG. 5 is a schematic diagram showing an exemplary configuration of a network facsimile system including a communication terminal according to another embodiment of the present invention.

FIG. 5 is a schematic diagram showing an exemplary configuration of a network facsimile system according to another embodiment of the present invention.

In this other embodiment, another T.38 terminal 3' having the same configuration as the T.38 terminal 3 is connected to another G3 FAX 5 having the same configuration as the G3 FAX 4 via a public switched telephone network. The G3 FAX 5 is also connected to the above-described T.38 terminal 3 via the public switched telephone network.

Next, the communication steps for conducting communication of image data in the network facsimile system according to this other embodiment of the present invention are described.

Figure 6:
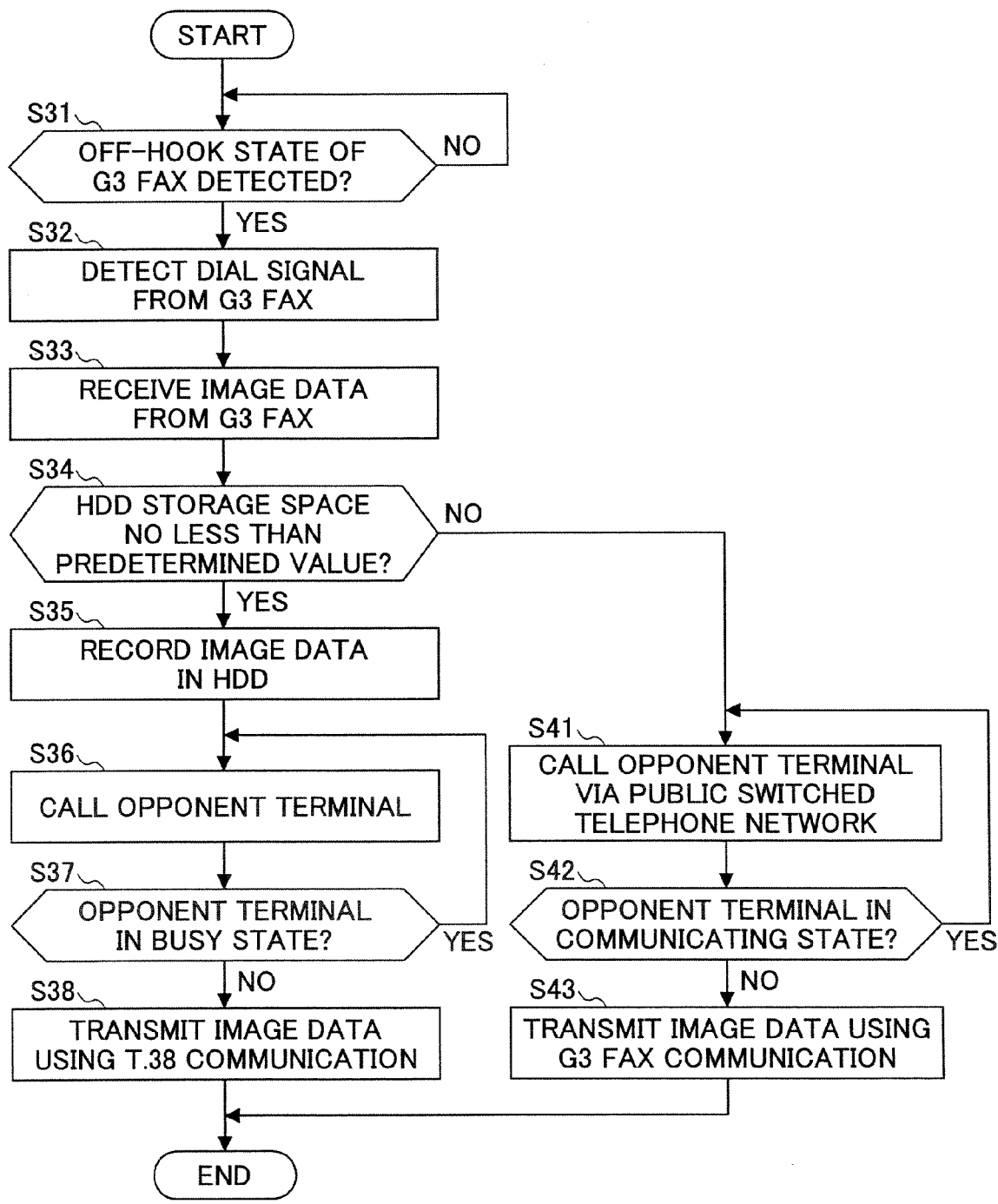
FIG. 6 is a flowchart showing the communication steps in a case of transmitting image data from a G3 FAX to another G3 FAX according to another embodiment of the present invention.

FIG. 6 is a flowchart showing the communication steps in a case of transmitting image data from the G3 FAX 4 to the G3 FAX 5 according to this other embodiment of the present invention.

The T.38 terminal 3 determines (detects) whether the G3 FAX 4 is in an off-hook state (i.e. calling up state) (Step S31).

The T.38 terminal 3 determines that the G3 FAX 4 is not in an off-hook state when the T.38 terminal 3 detects no calling tone from the G3 FAX 4 to an opponent terminal (No in Step S31), and continues to determine the state of the G3 FAX 4.

The T.38 terminal 3 determines that the G3 FAX 4 is in an off-hook state when the T.38 terminal 3 detects the G3 FAX 4 calling the opponent terminal (YES in Step S31).

Then, in response to the calling of the G3 FAX 4, the T.38 terminal 3 conducts a dial signal detection process for detecting a dial signal(s) from the G3 FAX 4 (calling source) (Step S32).

Then, the T.38 terminal 3 communicates with the G3 FAX 4 by using G3 facsimile communication in accordance with the G3 standards, to thereby receive image data from the G3 FAX 4 (Step S33).

Then, the T.38 terminal 3 determines whether there is a predetermined storage space (storage capacity) in the HDD 36 (Step S34). In this example, the predetermined storage space is 1 MBytes. The value of the predetermined storage space (storage capacity) may be arbitrarily set by the user.

In a case where the storage space of the HDD 36 is no less than the predetermined storage space (Yes in Step S33), the T.38 terminal 3 records the received image data in the HDD 36 (Step S35).

After the G3 facsimile communication is completed and the image data are stored in the HDD, the T.38 terminal 3 calls the opponent terminal (transmission destination, in this example, G3 FAX 5) which is to receive the image data (Step S36) transmitted from the G3 FAX 4.

The T.38 terminal 3 determines whether the opponent terminal (G3 FAX 5) is in a busy state, in other words, whether the opponent terminal (G3 FAX 5) is in a state of receiving other image data (Step S37).

In a case where the opponent terminal (G3 FAX 5) is in a busy state (unable to receive the image data) (Yes in Step S37), the T.38 terminal 3 continues to repeat Step S36.

In a case where the opponent terminal (G3 FAX 5) is not in a busy state (able to receive the image data) (No in Step S37), the T.38 terminal 3 reads out the image data stored in the HDD 36 and transmits the image data to the opponent terminal (G3 FAX 5) by using a high speed TCP transmission method conforming to the ITU-T Recommendation T.38 via the T.38 terminal 3' (Step S38). In other words, the image data are transmitted to the opponent terminal (G3 FAX 5) by T.38 communications (facsimile communications conforming to ITU-T Recommendation T.38) via the T.38 terminal 3'.

Meanwhile, in a case where the storage space of the HDD 36 is less than the predetermined storage space (No in Step S34), the T.38 terminal 3 calls the opponent terminal (transmission destination, in this example, G3 FAX 5) which is to receive the image data transmitted from the G3 FAX 4 via the public switched network (Step S41). That is, the image data are transmitted to the opponent terminal (G3 FAX 5) via the public switched network instead of the IP network 1 and the T.38 terminal 3'.

The T.38 terminal 3 determines whether the G3 FAX 5 is in a communicating state, in other words, whether the G3 FAX 5 is in a state of receiving other image data (Step S42).

In a case where the G3 FAX 5 is in a communicating state (unable to receive the image data) (Yes in Step S42), the T.38 terminal 3 continues to repeat Step S41.

In a case where the G3 FAX 5 is not in a communicating state (able to receive the image data) (No in Step S42), the T.38 terminal 3 transmits the received image data to the G3 FAX 4 by using G3 facsimile communication in accordance with G3 standards (Step S43).

In this other embodiment, it may not be possible to store all of the image data received by the T.38 terminal 3 in the storage space of the HDD 36 in a case where the storage space of the HDD 36 is less than the predetermined storage space. Therefore, the image data are transmitted directly to the G3 FAX 5 via the public switched telephone network instead of being transmitted through the IP network 1 and the T.38 terminal 3.

In transmitting the image data by using the T.38 communication, the communications may be switched to G3 FAX communication in a case where the NCU of the T.38 terminal 3 is in an unused state.

Further, the present invention is not limited to these embodiments, but variations and modifications may be made without departing from the scope of the present invention.

The present application is based on Japanese Priority Application No. 2005-196649 filed on Jul. 5, 2005, with the Japanese Patent Office, the entire contents of which are hereby incorporated by reference.

What is claimed is:

1. A communication terminal comprising:
    a communication terminal interface configured to communicate with a first facsimile terminal using analog facsimile communications;
    a network control unit configured to control analog facsimile communications of the communication terminal interface;
    a call detecting unit configured to detect a dial signal when the first facsimile terminal calls a second facsimile terminal;
    a receiver configured to receive image data from the first facsimile terminal when the dial signal is detected;
    a network interface unit for connecting to the second facsimile terminal via an internet protocol network;
    a settings unit configured to set a predetermined storage space requirement;
    a storage device configured to store image data received from the first facsimile terminal;
    a switching unit configured to select between communicating using analog facsimile communications or internet protocol facsimile communications based on a comparison of the predetermined storage space requirement to an amount of available storage space on the storage device, the image data received from the first facsimile being stored on the storage device when internet protocol facsimile communications is selected; and
    a transmitter configured to transmit image data to the second facsimile terminal using a communication protocol selected by the switching unit, the transmitter retrieves the stored image data from the storage device for transmission when the switching unit selects internet protocol facsimile communications.

2. The communication terminal as claimed in claim 1, wherein the image data is transmitted to the second facsimile terminal via analog facsimile communications when the amount of available storage space of the storage device is less than the predetermined storage space requirement.

3. The communication terminal as claimed in claim 1, wherein the first facsimile terminal is a Group 3 facsimile terminal.

4. The communication terminal as claimed in claim 1, wherein the internet protocol facsimile communications is a T.38 facsimile relay standard.

5. The communication terminal as claimed in claim 1, wherein the storage space requirement is set by a user.

6. A communication terminal comprising:
    a communication terminal interface configured to communicate with a first facsimile terminal using analog facsimile communications;
    a network interface unit configured to connect to an internet protocol network and to receive image data transmitted from a second facsimile terminal using T.38 communications;
    a storage device configured to store image data received from the second facsimile terminal; and
    an analog transmitter for reading out the image data stored in the storage device and transmitting the image data stored in the storage device to the first facsimile terminal using the analog facsimile communications.

7. The communication terminal as claimed in claim 6, wherein the first facsimile terminal is a Group 3 facsimile terminal.

8. The communication terminal as claimed in claim 6, wherein the second facsimile terminal is an Internet Aware Fax.

9. A method for communicating in a facsimile communications terminal comprising:
    connecting, at a communication terminal interface, with a first facsimile terminal using analog facsimile communications;

controlling, at a network control unit, an analog facsimile communications of the communication terminal interface;

detecting, at a call detecting unit, a dial signal when the first facsimile terminal calls a second facsimile terminal;

receiving, at a receiver, image data from the first facsimile terminal when the dial signal is detected;

setting, at a settings unit, a predetermined storage space requirement;

storing, at a storage device, image data received from the first facsimile terminal;

selecting, at a switching unit, between communicating using analog facsimile communications or internet protocol facsimile communications based on a comparison of the predetermined storage space requirement to an amount of available storage space on the storage device, and storing, at the storage device, the image data received from the first facsimile when internet protocol facsimile communications is selected; and transmitting, at a transmitter, image data to the second facsimile terminal using a communication protocol selected by the switching unit, retrieving the stored image data from the storage device for transmission when the switching unit selects internet protocol facsimile communications.

10. The method of communication in claim 9, wherein the image data is transmitted to the second facsimile terminal via analog facsimile communications when the amount of available storage space of the storage device is less than the predetermined storage space requirement.

11. The method of communication in claim 9, wherein the first facsimile terminal is a Group 3 facsimile terminal.

12. The method of communication in claim 9, wherein the internet protocol facsimile communications is a T.38 facsimile relay standard.

13. The method of communication in claim 9, wherein the storage space requirement is set by a user.

* * * * *